United States Patent [19]

Ishii

[11] Patent Number: 4,570,309
[45] Date of Patent: Feb. 18, 1986

[54] SLIDE FASTENER SLIDER WITH DETACHABLE PULL TAB

[75] Inventor: Susumu Ishii, Kurobe, Japan

[73] Assignee: Yoshida Kogyo K.K., Tokyo, Japan

[21] Appl. No.: 479,973

[22] Filed: Mar. 25, 1983

[30] Foreign Application Priority Data

Mar. 25, 1982 [JP] Japan .................. 57-47603

[51] Int. Cl.⁴ .......................................... A44B 19/26
[52] U.S. Cl. ........................................ 24/429; 24/236
[58] Field of Search .............. 24/429, 430, 236, 431

[56] References Cited

U.S. PATENT DOCUMENTS

| 503,158 | 8/1893 | Packard | 24/236 |
| 1,044,975 | 11/1912 | Baxter | 24/236 |
| 1,228,018 | 5/1917 | Hadley | 24/236 |
| 2,160,160 | 5/1939 | Marinsky et al. | 24/429 |
| 2,357,478 | 9/1944 | Koch | 24/236 |
| 2,530,438 | 11/1950 | Modrey | 70/68 |
| 2,607,976 | 8/1952 | Zahel | 24/429 X |
| 3,444,599 | 5/1969 | Amon | 24/236 |
| 3,778,871 | 12/1973 | Ratte, Jr. | 24/236 |
| 3,955,248 | 5/1976 | Akashi | 24/429 |

FOREIGN PATENT DOCUMENTS 170466 2/1952 Austria .................. 24/429

Primary Examiner—William E. Lyddane
Assistant Examiner—Peter A. Aschenbrenner
Attorney, Agent, or Firm—Hill, Van Santen, Steadman & Simpson

[57] ABSTRACT

A slide fastener slider has a body including a pair of upper and lower wings and a support lug projecting from the upper wing, and a pull tab having a pintle pivotably received in a space defined between the support lug and the upper wing. The support lug has an end spaced from the upper wing by a gap communicating with the space. The pintle is normally retained in the space by a resilient pull tab retainer that is normally urged to close off the gap. When the pull tab retainer is manually displaced out of the gap, the pintle can be pulled through the gap to detach the pull tab from the support lug.

8 Claims, 11 Drawing Figures

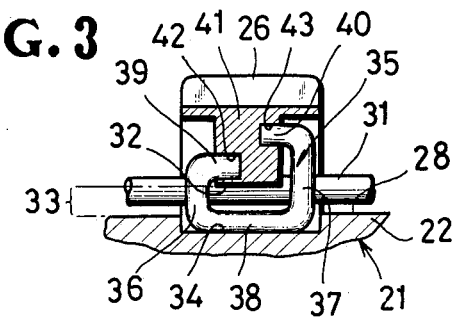
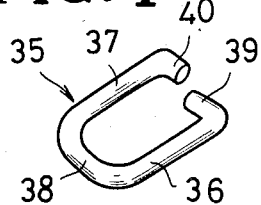
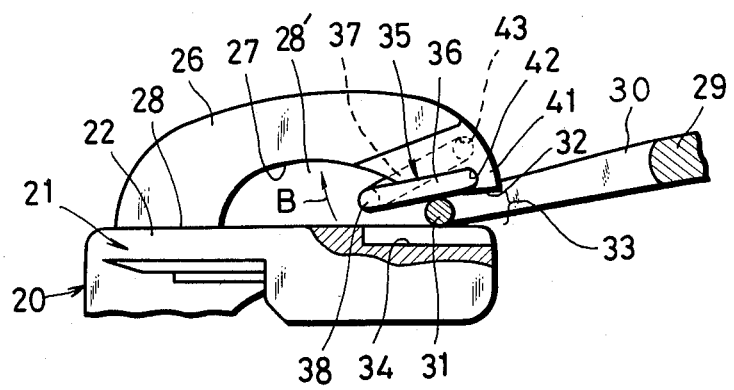

SLIDE FASTENER SLIDER WITH DETACHABLE PULL TAB

BACKGROUND OF THE INVENTION

1. Field of the Invention:

The present invention relates to a slide fastener slider with a detachable pull tab.

2. Description of the Prior Art:

U.S. Pat. No. 2,530,438 shows a slide fastener slider having a pull tab removably attached to a pull tab support or lug mounted on a slider body. The disclosed slider however has a complex structure by which the pull tab is attached to the lug, is unsightly in appearance, and renders it relatively difficult for the user to grip the pull tab reliably.

SUMMARY OF THE INVENTION

It is an object of the present invention to provide a slide fastener slider having a pull tab support or lug to which a pull tab can detachably be attached directly and easily.

Another object of the present invention is to provide a slide fastener slider having a relatively simple pull tab attachment structure by which a pull tab can removably be mounted on the slider body.

Still another object of the present invention is to provide a slide fastener slider which is relatively simple in construction and hence which can be assembled easily.

Still another object of the present invention is to provide a slide fastener slider with its pull tab easily replaceable with another pull tab to meet a certain mode of use or user's preference.

A still further object of the present invention is to provide a slide fastener slider which is sightly in appearance.

According to the present invention, a pull tab retainer is normally urged under its own resiliency to close off a gap between a slider wing and a support lug thereon to retain a pull tab pintle within a space defined by the slider wing and the support lug. When the pull tab retainer is displaced out of the gap, the pintle can be removed out of the space through the gap to thereby detach the pull tab from the support lug.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a fragmentary cross-sectional view taken along line III—III of FIG. 2;

FIG. 4 is a perspective view of a resilient pull tab retainer;

FIG. 5 is an enlarged fragmentary side elevational view of the slider of FIG. 2, showing the manner in which a pull tab is being attached;

DESCRIPTION OF THE PREFERRED EMBODIMENTS

Figure 1:
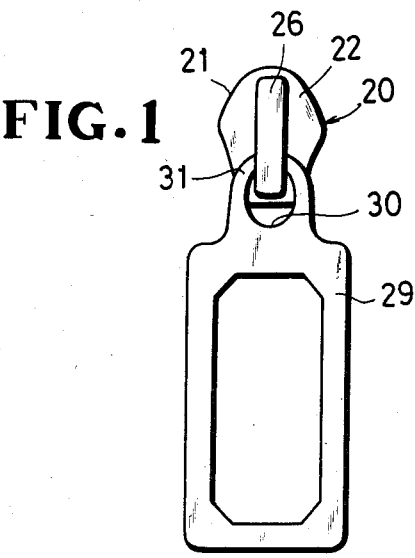
FIG. 1 is a plan view of a slider fastener slider according to an embodiment of the present invention.

The principles of the present invention are particularly useful when embodied in a slide fastener slider such as shown in FIG. 1, generally indicated by the reference numeral 20. The slide fastener slider 20 includes a slider body 21 composed of a pair of upper and lower wings 22, 23 spaced from each other and connected at one end by a post or separator 24. The upper and lower wings 22, 23 define therebetween a generally Y-shaped guide channel 25 for the passage therethrough of a pair of rows of coupling elements (not shown) to bring them into or out of interdigitating engagement with each other.

Figure 2:
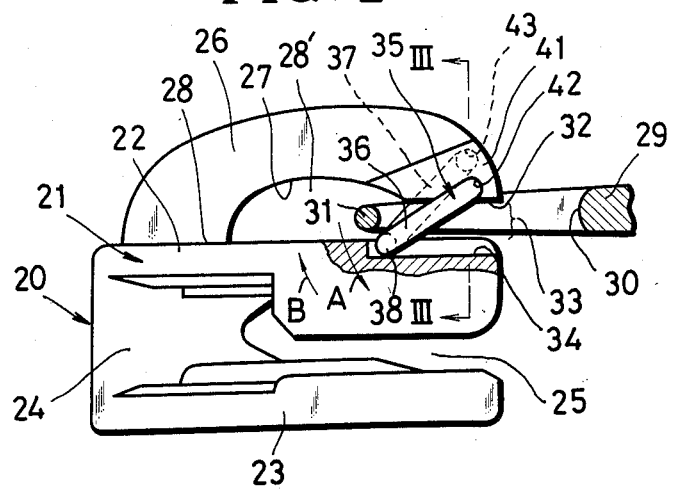
FIG. 2 is an enlarged fragmentary side elevational view, partly in cross section, of the slider shown in FIG. 1.

As shown in FIGS. 2 and 5, a pull tab support or lug 26 is mounted at one end on the upper wing 22 and has a lower surface 27 spaced upwardly from an upper surface 28. of the upper wing 22 to thereby define a space 28' between the upper wing 22 and the lug 26. A pull tab 29 has an opening 30 in one end thereof, defined partly by an arcuate pintle 31 which is normally received in the space 28'. The pull tab 29 as it is mounted on the slider body 21 is pivotably movable with the pintle 31 loosely retained in the space 28'. The lug 26 has a free end 32 remote from its mounted end and spaced from the upper surface 28 of the upper wing 22 by a distance which is larger than the diameter of the pintle 31 so that the latter can be moved through a gap 33 between the end 32 and the upper surface 28. The gap 33 is in communication with the space 28'.

The gap 33 is normally closed by a resilient pull tab retainer 35 acting as a torsion spring of formed wire between the upper wing 22 and the lug 26. The upper surface 28 of the upper wing 22 has a recess 34 disposed below the end 32 of the lug 26. As illustrated in FIG. 4, the pull tab retainer 35 is basically U-shaped and comprises a pair of laterally spaced legs 36, 37 connected by a lateral joint 38, and a pair of confronting bent ends 39, 40 extending from the legs 36, 37 remotely from the lateral joint 38. The lateral joint 38 is slightly twisted on itself such that the legs 36, 37 are normally out of lateral alignment with each other. As best shown in FIG. 3, the lug 26 has a thin portion 41 near the end 32 with a pair of recesses 42, 43 defined in its opposite surfaces and positioned out of lateral registry. The pull tab retainer 35 is attached across the gap 33 with the bent ends 39, 40 pivotably fitted respectively in the recesses 42, 43. The shape of the pull tab retainer 35 and the position of the recesses 42, 43 are selected such that the pull tab retainer 35 is normally urged under its own resiliency to move downwardly in the direction of the arrow A (FIG. 2) with the lateral joint 38 received in the recess 34, thus closing off the gap 33.

For removing the pull tab 29, the pull tab 29 is first displaced slightly to the left (FIG. 2), and then the pull tab retainer 35 is moved by fingers (not shown) in the direction of the arrow B against the resiliency of the retainer 35 until the retainer 35 is lifted clear of the gap 33. The pull tab 29 can now be detached from the lug 26 by pulling the pintle 31 out through the gap 33. The pull tab retainer 35 will be lowered and close the gap 33 again when released.

When the detached pull tab 29 is to be attached again, it is pushed along so that the pintle 31 is inserted into the gap 33 and forces the retainer 35 to turn upwardly in the direction of the arrow B (FIG. 5) against its own resiliency. Continued forced insertion of the pintle 31 causes the latter to slide below and past the lateral joint 38 and then into the space 28', whereupon the retainer 35 snaps downward and closes the gap 33. Accordingly, the pull tab 29 can be attached and detached quite easily. The pull tab retainer 35 is relatively simple in construction, and can operate stably and reliably for a long period of time.

Figure 6:
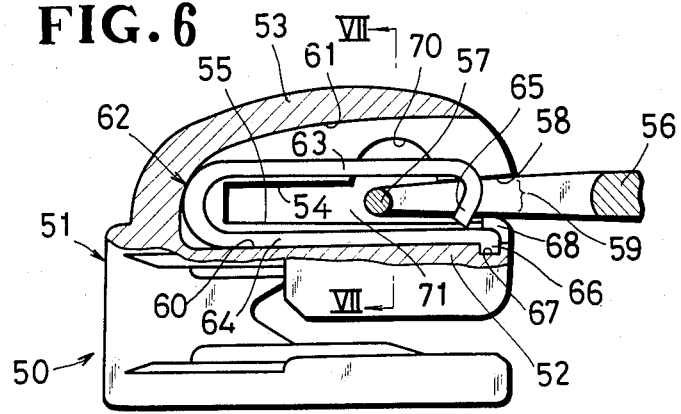
FIG. 6 is an enlarged fragmentary side elevational view, partly in cross section, of a slide fastener slider according to another embodiment.
Figure 7:
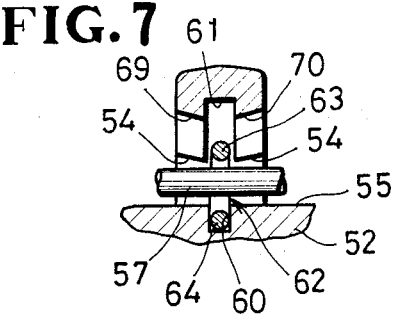
FIG. 7 is a fragmentary cross-sectional view taken along line VII—VII of FIG. 6.
Figure 8:
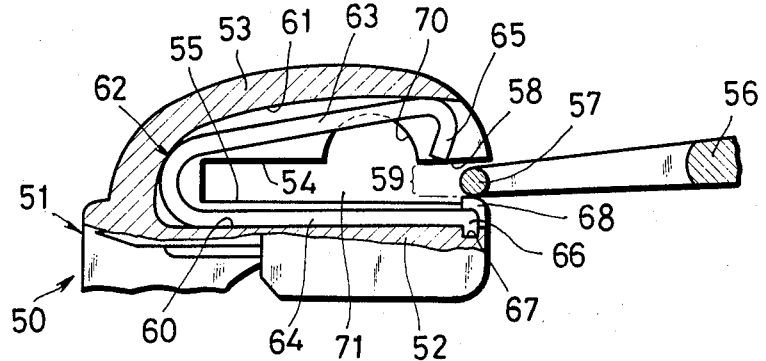
FIG. 8 is a fragmentary side elevational view of the slider of FIG. 6, illustrating of the way in which a pull tab is being attached.

FIG. 6 through 8 illustrate a slide fastener slider 50 according to another embodiment of the present invention. The slider 50 includes a slider body having an upper wing 52 from which projects an integral pull tab support lug 53 having a lower surface 54 spaced upwardly from an upper surface 55 of the upper wing 52. A pull tab 56 has a pintle 57 which is normally disposed in a space 71 defined between the surfaces 54, 55. The lug 53 has a free end 58 remote from its proximal end and spaced upwardly from the upper surface 55 of the upper wing 52 to provide a gap 59 large enough to enable the pintle 57 to pass therethrough. As better shown in FIG. 7, the upper wing 52 has a central slot 60 opening upwardly and the lug 53 has a central groove 61 opening downwardly in vertical registry with the slot 60.

A substantially U-shaped resilient pull tab retainer 62 of formed spring wire is placed in the slot 60 and the groove 61. The pull tab retainer 62 is composed of a pair of interconnected legs 63, 64 spaced from each other and extending normally parallel to each other, the legs 64, 63 being positioned respectively in the slot 60 and the groove 61. The leg 63 has a bent end portion 65 normally extending across the gap 59 and the leg 64 has a bent end 66 fitted in a cavity 67 in the slot 60 below the free end 58 of the lug 53. The bent end 66 is securely mounted in the upper wing 52 by staking a portion 68 of the upper wing 52 around the cavity 67 and beneath the free end 58 of the lug 53. The lug 53 has a pair of semicircular holes 69, 70 defined laterally therethrough one on each side of the groove 61 and opening into the space 71.

With the pull tab retainer 62 positioned as shown in FIG. 6, the bent end portion 59 closes off the gap 65 and prevents the pintle 57 from being out of the space 71. For detaching the pull tab 56 from the slider body 51, the leg 63 of the pull tab retainer 62 is lifted by fingers (not shown) inserted through the holes 69, 70 against the resiliency of the retainer 62 as shown in FIG. 8. Then, the pull tab 56 is pulled off the lug 53 by guiding the pintle 57 through the gap 59. When released, the leg 63 is resiliently lowered to the position of FIG. 6. For re-attachment of the pull tab 56, the pintle 57 thereof is pushed into the gap 59 to thereby force the bent end portion 65 upwardly out of the gap 59. At this time, the upward movement of the leg 63 may be assisted by fingers inserted through the holes 69, 70. The pintle 57 is finally moved past the bent end portion 65 into the space 71, and then the leg 63 snaps downwardly to the position of FIG. 6.

Figure 9:
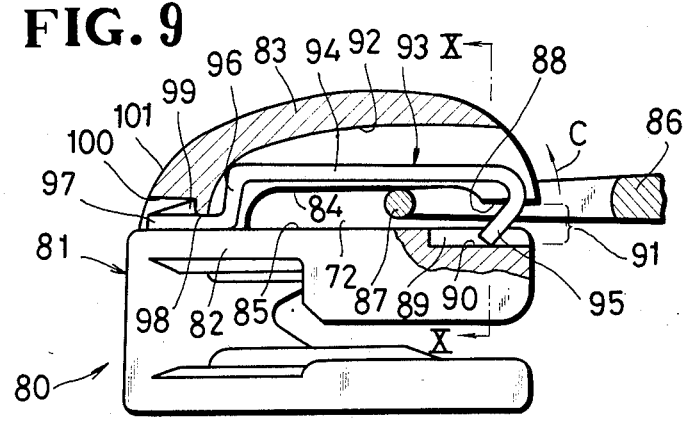
FIG. 9 is an enlarged fragmentary side elevational view, with parts in cross section, of a slide fastener slider according to still another embodiment.
Figure 10:
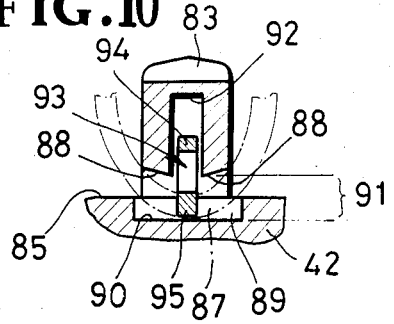
FIG. 10 is a fragmentary cross-sectional view taken along line X—X of FIG. 9.
Figure 11:
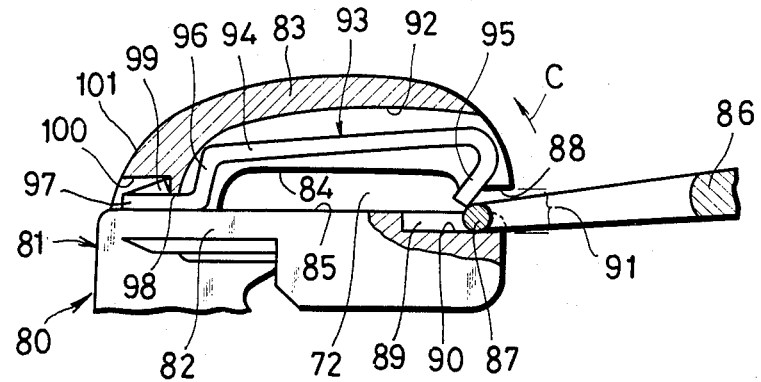
FIG. 11 is a fragmentary side elevational view of the slider of FIG. 9, illustrating of the manner in which a pull tab is being attached.

According to still another embodiment shown in FIGS. 9 through 11, a slide fastener slider 80 has a slider body 81 including an upper wing 82 and a lug 83 projecting upwardly therefrom. The lug 83 has a lower surface 84 spaced upwardly from an upper surface 85 of the upper wing 82 with a space 72 defined therebetween. A pull tab 86 has a pintle 87 normally received in the space 72. As shown in FIG. 10, the pintle 87 is of a curved or partly elliptical configuration. The lug 83 has a free end 88 spaced from the upper surface 85 of the upper wing 82. The upper surface 85 has a recess 89 opening upwardly and disposed below the free end 88 of the lug 83, the recess 89 having a bottom 90. The free end 88 of the lug 83 is spaced from the bottom 90 of the recess 89 by a gap 91 defined therebetween and communicating with the space 72. The gap 91 is wide enough to allow the pintle 87 to pass therethrough. The lug 83 has a central groove 92 opening downwardly into the space 72.

A pull tab retainer 93 of formed spring wire is disposed almost entirely in the groove 92. The retainer 93 includes a rod 94 having a bent end portion 95 normally positioned across the gap 91 and a crank-shaped end portion 96 with its end 97 extending through a hole 98 defined in the lug 83 at the proximal end thereof and positioned at the upper surface 85 of the upper wing 82. The end 97 of the retainer 93 has a raised portion 99 secured in a recess 100 defined in the lug 83 behind the hole 98 and opening at a rear surface 101 thereof. The recess 100 communicates with and is larger than the hole 98.

The bent end portion 95 is normally engages on the bottom 90 of the recess 89, closing off the gap 91 to prevent the pintle 87 from being moved out of the space 72. When the pull tab 86 is to be detached, the bent end portion 95 is elevated by a finger (not shown) in the direction of the arrow C (FIG. 11) against the resiliency of the retainer 93 until the bent end portion 95 is displaced out of the gap 91. Then the pintle 87 is guided through the gap 91. Since the pintle 87 is curved or partly elliptical in shape, it can easily pass through the gap 91 as shown in FIG. 10. The retainer 93 will snappingly return to its normal position as shown in FIG. 9 when released.

To attach the pull tab 86 again, the pintle 87 is pushed into the gap 91 against the bent end portion 95, which is forcibly lifted in the direction of the arrow C against the resiliency of the retainer 93. The pintle 87 is forced in until it moves past the bent end portion 95 into the space 72. The retainer 93 then snaps downwardly to the normal position in which the bent end portion 95 closes off the gap 91 and is held against the bottom 90 of the recess 89.

With the arrangement of the present invention, the pull tab can directly and quickly be attached to and detached from the pull tab support lug in a simple operation. The pull tab retainer is relatively simple in construction and hence can operate reliably and stably for an extended portion of time. The overall slider structure is accordingly relatively simple and sightly in appearance, and can be assembled with ease. The pull tab can therefore be replaced with other pull tabs to suit desired applications or meet user's preference.

Although various minor modifications might be made or suggested by those versed in the art, it should be understood that I wish to embody within the scope of the patent warranted hereon, all such embodiments as reasonably and properly come within the scope of my contribution to the art.

What I claim as my invention is:

1. A slide fastener slider comprising:
 (a) a body including a pair of spaced wings;
 (b) a support lug mounted on one of said wings with a space defined between said support lug and said one of the wings, said support lug having an end spaced from said one of the wings by a gap communicating with said space, and having a pair of recesses opening away from each other out of mutual registry;
 (c) a pull tab having a pintle normally disposed in said space, said gap being wide enough to allow said pintle to pass therethrough; and
 (d) a resilient pull tab retainer movable between a first position in which said retainer normally closes said gap under its own resiliency and a second position in which said retainer is displaced out of said gap against its own resiliency, said resilient pull tab retainer comprising a pair of spaced legs extending out of alignment with each other and having a pair of bent ends, respectively, and, a joint interconnecting said spaced legs remotely from said bent ends, said bent ends being fitted respectively in said recesses, said legs being normally urged resiliently to extend across and close off said gap in said first position.

2. A slide fastener slider according to claim 1, said one of the wings having a recess opening toward said end of said support lug, said joint being normally received resiliently in said recess in said first position.

3. A slide fastener slider comprising:
 (a) a body including a pair of spaced wings, one of said wings having a slot;
 (b) a support lug mounted on said one of said wings with a space defined between said support lug and said one of the wings, said support lug having an end spaced from said one of the wings by a gap communicating with said space, and having a groove aligned with said slot and both said groove and said slot opening into said space;
 (c) a pull tab having a pintle normally disposed in said space, said gap being wide enough to allow said pintle to pass therethrough;
 (d) a resilient pull tab retainer movable between a first position in which said retainer normally closes said gap under its own resiliency and a second position in which said retainer is displaced out of said gap against its own resiliency, said pull tab retainer including a pair of first and second legs disposed respectively in said slot and said groove, said first leg having an end secured to said one of the wings, said second leg having a bent end portion normally extending across and closing off said gap in said first position; and
 (e) said support lug having at least one hole communicating with said space for allowing said second leg to be manually assisted in moving from said first to said second position.

4. A slide fastener slider according to claim 3, said legs being elongated, and said end portion of said second leg being bent at an acute angle.

5. A slide fastener slider according to claim 3, said pull tab retainer being a spring of formed wire.

6. A slide fastener slider comprising:
 (a) a body including a pair of spaced wings;
 (b) a support lug mounted on one of said wings with a space defined between said support lug and said one of the wings, said support lug having an end spaced from said one of the wings by a gap communicating with said space, said support lug having a groove;
 (c) a pull tab having a pintle normally disposed in said space, said gap being wide enough to allow said pintle to pass therethrough; and
 (d) a resilient pull tab retainer movable between a first position in which said retainer normally closes said gap under its own resiliency and a second position in which said retainer is displaced out of said gap against its own resiliency, said pull tab retainer comprising a rod substantially disposed in said groove and having an end secured to said support lug and an opposite bent end portion normally extending across and closing off said gap in said first position.

7. A slide fastener slider according to claim 6, said one of the wings having a recess opening toward said end of said support lug and having a bottom, said bent end portion being normally held against said bottom in said first position.

8. A slide fastener slider according to claim 6, said opposite end portion of said retainer being bent at an acute angle.

* * * * *